United States Patent
Pflueger et al.

(10) Patent No.: US 9,362,794 B2
(45) Date of Patent: Jun. 7, 2016

(54) STATOR WINDING COMPRISING MULTIPLE PHASE WINDINGS

(75) Inventors: Klaus Pflueger, Eberdingen (DE); Christoph Schwarzkopf, Walheim (DE); Martin Henne, Moeglingen (DE); Klaus Herbold, Asperg (DE); Helmut Kreuzer, Schwieberdingen (DE); Steffen Didra, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 258 days.

(21) Appl. No.: 13/991,421

(22) PCT Filed: Nov. 30, 2011

(86) PCT No.: PCT/EP2011/071420
§ 371 (c)(1),
(2), (4) Date: Jul. 18, 2013

(87) PCT Pub. No.: WO2012/072698
PCT Pub. Date: Jun. 7, 2012

(65) Prior Publication Data
US 2013/0307369 A1    Nov. 21, 2013

(30) Foreign Application Priority Data
Dec. 1, 2010  (DE) .................. 10 2010 053 717

(51) Int. Cl.
*H02K 3/28*  (2006.01)
*H02K 3/50*  (2006.01)
*H02K 3/12*  (2006.01)

(52) U.S. Cl.
CPC ... *H02K 3/28* (2013.01); *H02K 3/12* (2013.01)

(58) Field of Classification Search
CPC ....... H02K 3/28; H02K 1/00; H02K 2201/00; H02K 2203/00; H02K 3/50
USPC .............. 310/179, 184, 208, 254.1, 195, 198, 310/203
See application file for complete search history.

(56) References Cited

U.S. PATENT DOCUMENTS

| | | | |
|---|---|---|---|
| 6,177,747 B1 | 1/2001 | Maeda et al. | |
| 6,441,526 B1* | 8/2002 | Oohashi et al. | 310/184 |
| 2002/0079771 A1* | 6/2002 | Taji et al. | 310/179 |
| 2007/0108863 A1* | 5/2007 | Bischof et al. | 310/180 |
| 2012/0274171 A1* | 11/2012 | Ishikawa et al. | 310/198 |

FOREIGN PATENT DOCUMENTS

| | | |
|---|---|---|
| EP | 1124305 | 8/2001 |
| EP | 1494337 | 1/2005 |
| WO | WO 2011089749 A1 * | 7/2011 |

OTHER PUBLICATIONS

International Search Report for Application No. PCT/EP2011/071420 dated Nov. 28, 2012 (2 pages).

* cited by examiner

*Primary Examiner* — Michael Andrews
(74) *Attorney, Agent, or Firm* — Michael Best & Friedrich LLP

(57) ABSTRACT

Stator winding (18) comprising multiple phase windings (12). A phase winding has at least two partial phase windings (120*a*, 120*b*) which include coils (123) and coil connectors (126) that run parallel.

12 Claims, 4 Drawing Sheets

STATOR WINDING COMPRISING MULTIPLE PHASE WINDINGS

BACKGROUND OF THE INVENTION

The invention relates to stator winding for electric machines.

SUMMARY OF THE INVENTION

The invention provides a stator winding comprising multiple phase windings, wherein a phase winding has at least two phase winding elements, wherein the phase winding elements have coils and coil connectors, and the coil connectors are routed parallel to one another.

DETAILED DESCRIPTION

Figure 1:
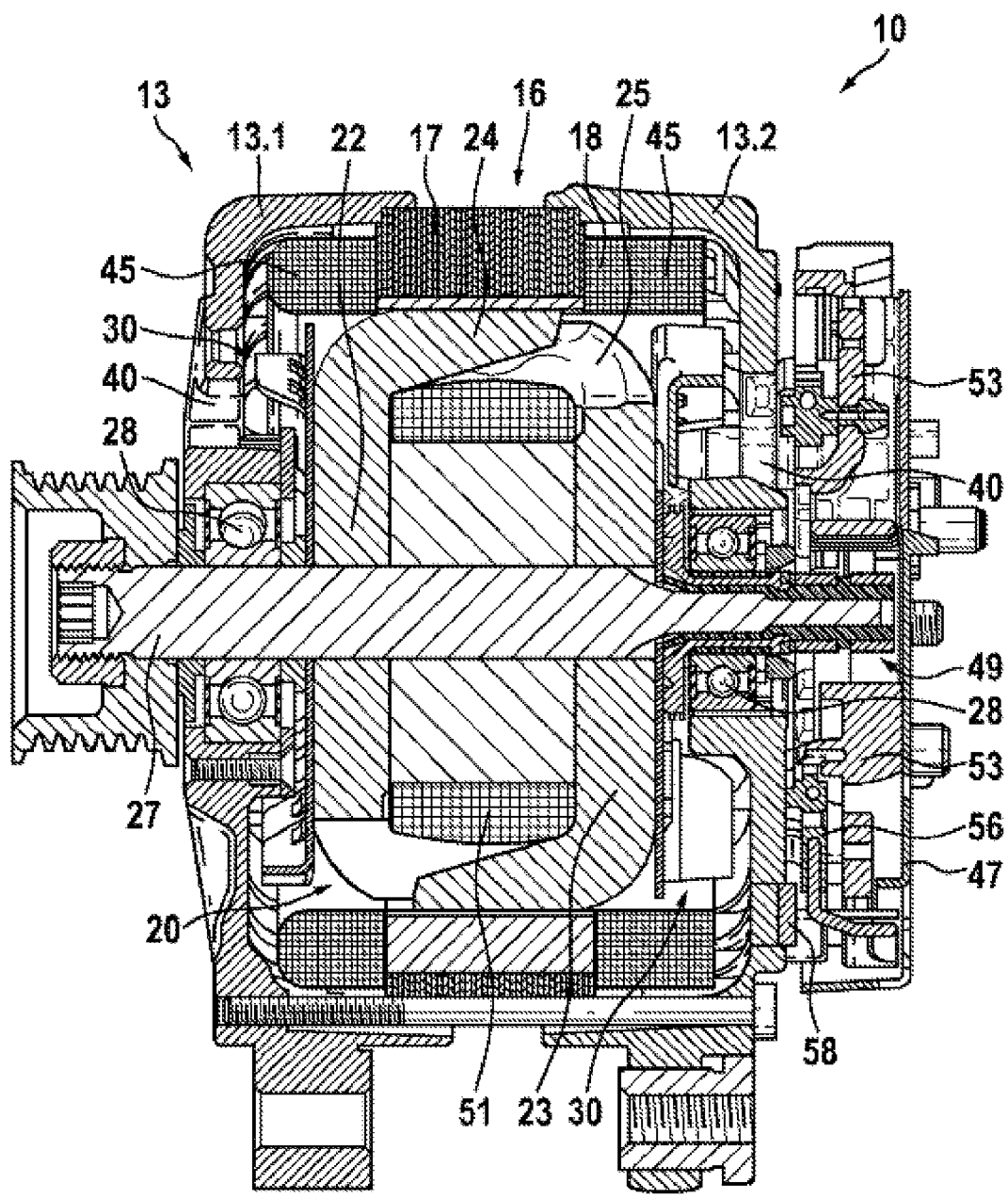
FIG. 1 is a longitudinal section through an electric machine embodying the invention.

FIG. 1 shows a longitudinal section through an electric machine 10, in this case in the embodiment as a generator or AC generator for motor vehicles. This electric machine 10 has, inter alia, a two-part housing 13, which comprises a first end plate 13.1 and a second end plate 13.2. The end plate 13.1 and the end plate 13.2 house a so-called stator 16, which comprises on one side a stator core 17 which is substantially in the form of a circular ring, wherein a stator winding 18 is inserted into axially extending slots pointing radially inward in said stator. This ring-shaped stator 16 surrounds, with its slotted surface pointing radially inward, a rotor 20 in the form of a claw-pole rotor. The rotor 20 comprises, inter alia, two claw-pole plates 22 and 23, with in each case axially extending claw-pole fingers 24 and 25 being arranged on the outer circumference of said claw-pole plates. Both claw-pole plates 22 and 23 are arranged in the rotor 20 in such a way that their claw-pole fingers 24 and 25 extending in the axial direction alternate with one another over the circumference of the rotor 20. This results in magnetically required interspaces between the oppositely magnetized claw-pole fingers 24 and 25, which are referred to as claw-pole interspaces. The rotor 20 is mounted rotatably in the respective end plates 13.1 and 13.2 by means of a shaft 27 and in each case one rolling bearing 28 located in each case on a rotor side.

The rotor 20 has in total two axial end faces, to which in each case one fan 30 is fastened. This fan 30 substantially comprises a plate-shaped or disk-shaped section, from which fan blades emerge in a known manner. These fans 30 serve the purpose of enabling air exchange between the outside of the electric machine 10 and the interior of the electric machine 10 via openings 40 in the end plates 13.1 and 13.2. For this purpose, the openings 40 are provided substantially at the axial ends of the end plates 13.1 and 13.2, via which cooling air is sucked into the interior of the electric machine 10 by means of the fans 30. This cooling air is accelerated radially outward by the rotation of the fans 30, with the result that it can pass through the winding overhang 45 which is permeable to cooling air. By virtue of this effect, the winding overhang 45 is cooled. Once it has passed through the winding overhang 45 or once it has flowed around this winding overhang 45, the cooling air takes a path radially outward through openings (not illustrated here in this FIG. 1).

A protective cap 47, which protects various component parts from environmental influences, is located on the right-hand side in FIG. 1. Thus, this protective cap 47 covers a so-called slip ring assembly 49, for example, which serves the purpose of supplying field current to a field winding 51. A heat sink 53 is arranged around this slip ring assembly 49, said heat sink acting in this case as a positive heat sink. The end plate 13.2 acts as the so-called negative heat sink. A connection plate 56 is arranged between the end plate 13.2 and the heat sink 53 and serves the purpose of connecting negative diodes 58 arranged in the end plate 13.2 and positive diodes (not shown here in this illustration) in the heat sink 53 to one another and therefore representing a bridge circuit known per se.

Figure 2:
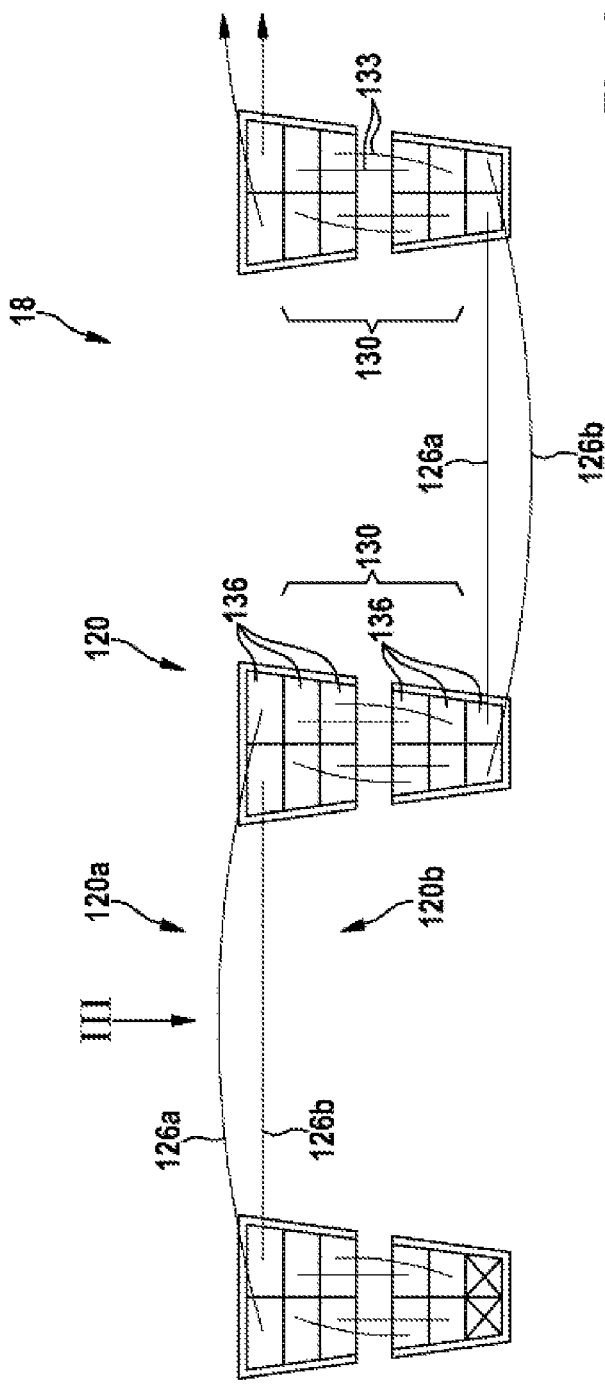
FIG. 2 is a detail of a schematic side view of a phase winding of a stator winding comprising multiple phase windings.

FIG. 2 shows a detail of a schematic side view of a phase winding 120 of a stator winding 18 comprising multiple phase windings 120. The phase winding 120 has at least two phase winding elements 120a, 120b. The phase winding elements 120a, 120b have coils 123 and coil connectors 126a, 126b. The coil connectors 126 are routed parallel to one another. Of the three phase windings 120 which are required in the case of a three-phase embodiment, only one is shown. As can be seen from FIG. 3, the coil connectors 126a, 126b which are routed parallel to one another have different lengths.

Figure 4A:
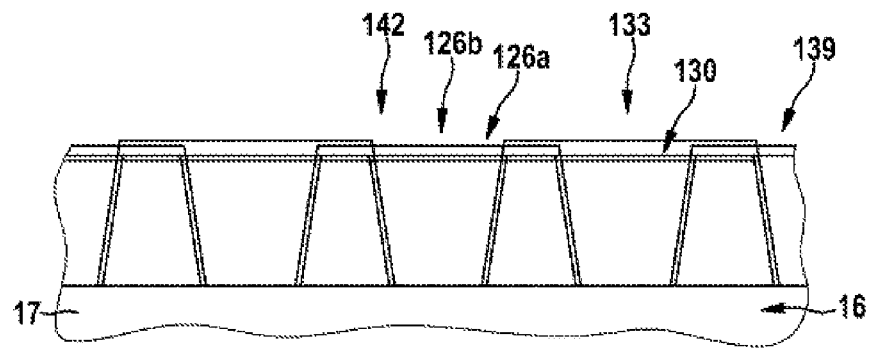
FIG. 4a is a schematic radial view of a stator.

FIG. 4a shows a schematic radial view of a stator 16. The stator winding 18 has an inner end winding 130, which has coil-side connectors 133 which connect coil sides 136, which are illustrated symbolically in FIG. 2. The inner end winding 130 has a certain axial extent from a stator core 17. The coil connectors 126 of different phase winding elements 120a, 120b intersect one another in the end winding 139. An intersection point 142 formed thereby is removed from the stator core 17 by such a distance that the inner end winding 130 is located between the intersection point 142 and the stator core 17.

Figure 4B:
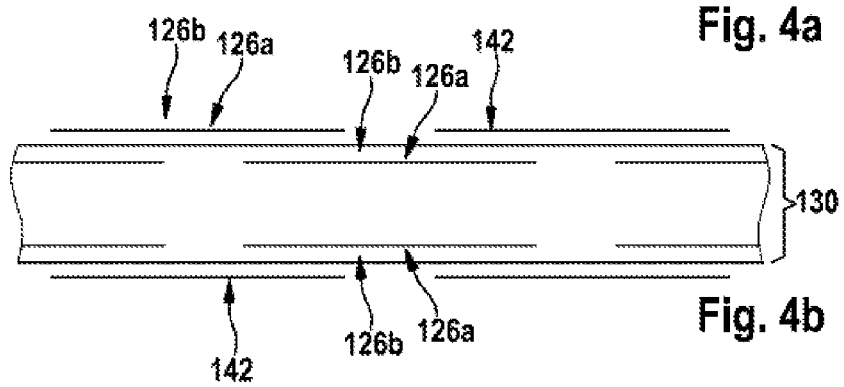
FIG. 4b is a schematic view of the end winding from its axial side.

FIG. 4b shows the end winding 130 from its axial side in a very schematized view. The inner end winding 130 is visualized by two continuous lines. Coil connectors 126a, 126b are illustrated by single lines. Lines arranged one above the other indicate intersection points 142.

Figure 3:
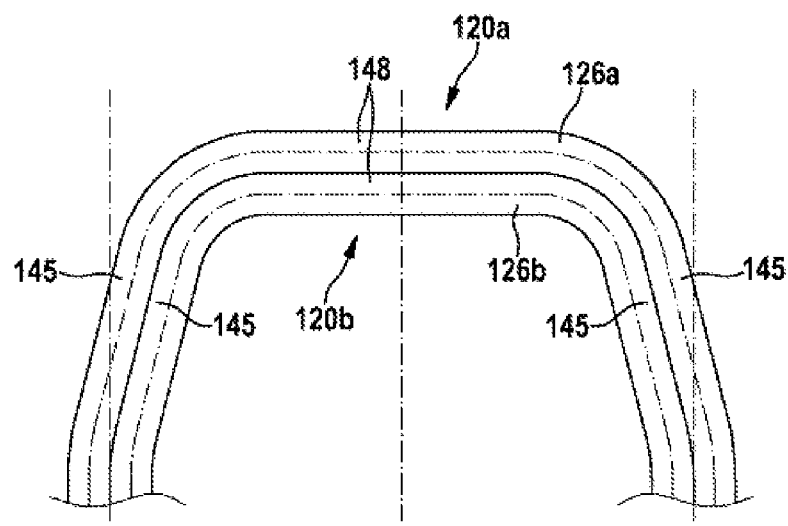
FIG. 3 is a view taken in the direction of arrow III in FIG. 2.

As can clearly be seen from FIG. 3, the coil connectors 126 have a trapezoidal form with in each case two sloping sections 145 and a straight section 148 therebetween.

Figure 5:
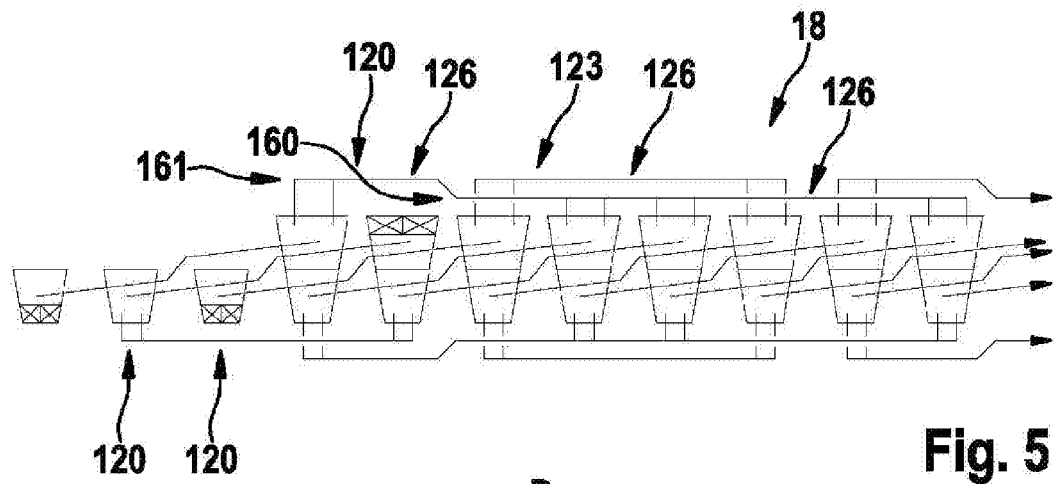
FIG. 5 is a schematic view of a stator winding and the three phase windings thereof.

FIG. 5 shows a somewhat clear schematic view of a stator winding 18 and the three phase windings 120 thereof in this case.

The coil connectors 126 of the three phase windings 120 with their straight sections 148 are arranged in two radial layers 160, 161. Two pairs of coil connectors 126 are arranged in each case completely in an inner radial layer 160 and an outer radial layer 161. The coil connectors 126 of a third phase winding 120 are arranged both in the inner radial layer 160 and in the outer radial layer 161.

Figure 6:
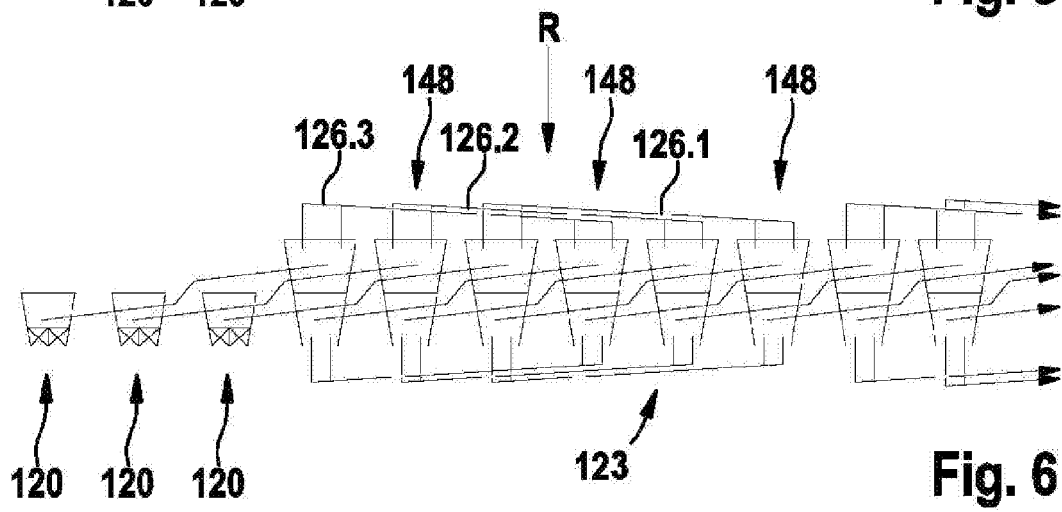
FIG. 6 is an alternative to FIG. 5.

FIG. 6 shows, as an alternative to FIG. 5, how the coil connectors 126 are arranged in such a way that a pair of coil connectors 126.1 of a phase winding 120 is arranged furthest radially outwards and another pair of coil connectors 126.3 of another phase winding 120 with its straight section 148 is arranged furthest radially inwards, wherein a further pair of coil connectors 126.2 of another phase winding 120 is arranged between the straight sections 148 of the other phase windings 120 in the radial direction (R).

Figure 7:
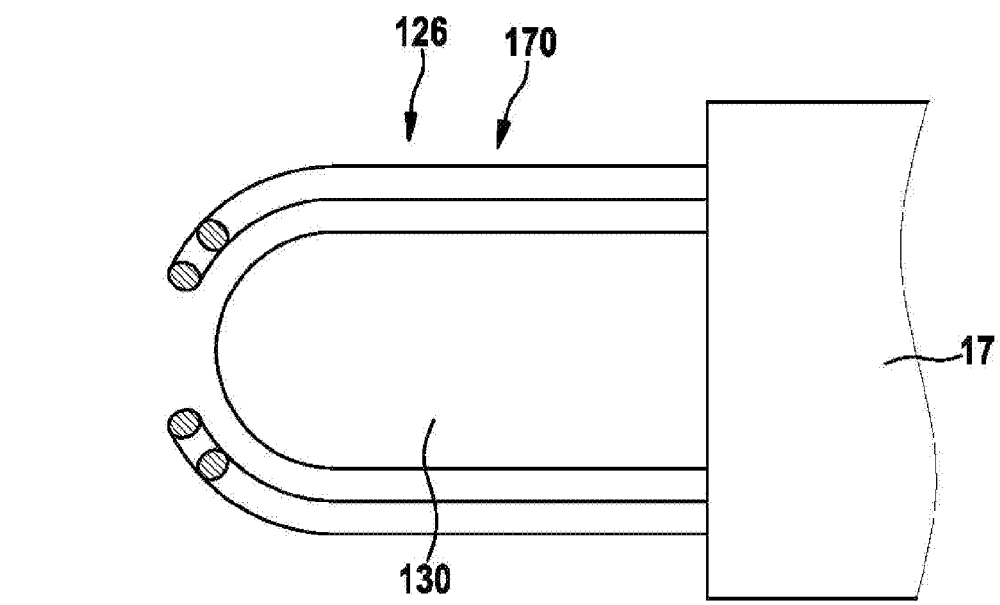
FIG. 7 illustrates how the inner end winding bulges axially outward (on the left-hand side in the figure) slightly in both radial directions.

It is clear from FIG. 7 that the inner end winding 130 bulges axially outward (on the left-hand side in the figure) slightly in both radial directions; bulge 170. A pair of coil connectors 126 is warped outward radially on the outside (at the top in the figure) in order to be arranged with the straight section 148 further radially inward again in the direction toward said straight section 148.

The phase windings 120 or phase winding elements 120a and 120b are wound from a wire in one piece. That is to say that the phase winding elements 120a and 120b consist of in each case one insulated wire section.

What is claimed is:

1. A stator winding (18) comprising multiple phase windings (120), wherein a phase winding has at least two phase winding elements (120a, 120b), wherein the phase winding elements (120a, 120b) have coils (123) and coil connectors (126), and the coil connectors (126) are routed parallel to one another, wherein the coil connectors (126) are arranged in such a way that a first pair of coil connectors (126) of a first phase winding (120) is arranged furthest radially outwardly in a radial direction R, whereby the first pair of coil connectors (126) of the first phase winding (120) is arranged completely in an outer radial layer (161), and a second pair of coil connectors (126) of a second phase winding (120) with a straight section (148) is arranged furthest radially inwardly whereby the second pair of coil connectors (126) of the second phase winding (120) is arranged completely in an inner radial layer (160), wherein a third pair of coil connectors (126) of a third phase winding (120) is arranged between straight sections (148) of other phase windings (120) in the radial direction (R), wherein the third pair of coil connectors (126) of the third phase winding (120) is arranged in both the outer radial layer (161) and the inner radial layer (160), and wherein the third pair of coil connectors (126) of the third phase winding (120) is arranged between the first pair of coil connectors (126) and the second pair of coil connectors (126).

2. The stator winding (18) as claimed in claim 1, characterized in that the stator winding (18) has an inner end winding (130), which has coil-side connectors (133) which connect coil sides (136), and which has a certain axial extent from a stator core (17), and coil connectors (126) of different phase winding elements (120a, 120b) intersect one another in an end winding (139), wherein an intersection point (142) formed thereby is removed from the stator core (17) by such a distance that the inner end winding (130) is located between the intersection point (142) and the stator core (17).

3. The stator winding (18) as claimed in claim 2, characterized in that the coil connectors (126) which are routed parallel to one another have different lengths.

4. The stator winding (18) as claimed in claim 2, characterized in that the coil connectors (126) have a trapezoidal form with in each case two sloping sections (145) and a straight section (148) therebetween.

5. The stator winding (18) as claimed in claim 4, characterized in that the coil connectors (126) are arranged in such a way that a pair of coil connectors (126) of a phase winding (120) is arranged furthest radially outwards and another pair of coil connectors (126) of another phase winding (120) with its straight section (148) is arranged furthest radially inwards, wherein a further pair of coil connectors (126) of another phase winding (120) is arranged between the straight sections (148) of the other phase windings (120) in the radial direction (R).

6. The stator winding (18) as claimed in claim 5, characterized in that the coil connectors (126) of three phase windings (120) with their straight sections (148) are arranged in two radial layers (160, 161), wherein two pairs of coil connectors (126) are each arranged completely in an inner and an outer radial layer (160, 161), and the coil connectors (126) of a third phase winding (120) are arranged both in the inner and in the outer radial layer (160, 161).

7. The stator winding (18) as claimed in claim 6, characterized in that radially outer coil connectors (126) are warped radially outward in order to be arranged further radially inwards again with the straight section (148), in the direction toward the straight section (148).

8. The stator winding (18) as claimed in claim 1, characterized in that the coil connectors (126) which are routed parallel to one another have different lengths.

9. The stator winding (18) as claimed in claim 1, characterized in that the coil connectors (126) have a trapezoidal form with in each case two sloping sections (145) and a straight section (148) therebetween.

10. The stator winding (18) as claimed in claim 1, characterized in that the coil connectors (126) of three phase windings (120) with straight sections (148) are arranged in two radial layers (160, 161), wherein two pairs of coil connectors (126) are each arranged completely in an inner and an outer radial layer (160, 161), and the coil connectors (126) of a third phase winding (120) are arranged both in the inner and in the outer radial layer (160, 161).

11. The stator winding (18) as claimed in claim 1, characterized in that radially outer coil connectors (126) are warped radially outward in order to be arranged further radially inwards again with a straight section (148), in the direction toward the straight section (148).

12. An electric machine comprising a stator winding as claimed in claim 1.

* * * * *